Figure 1:
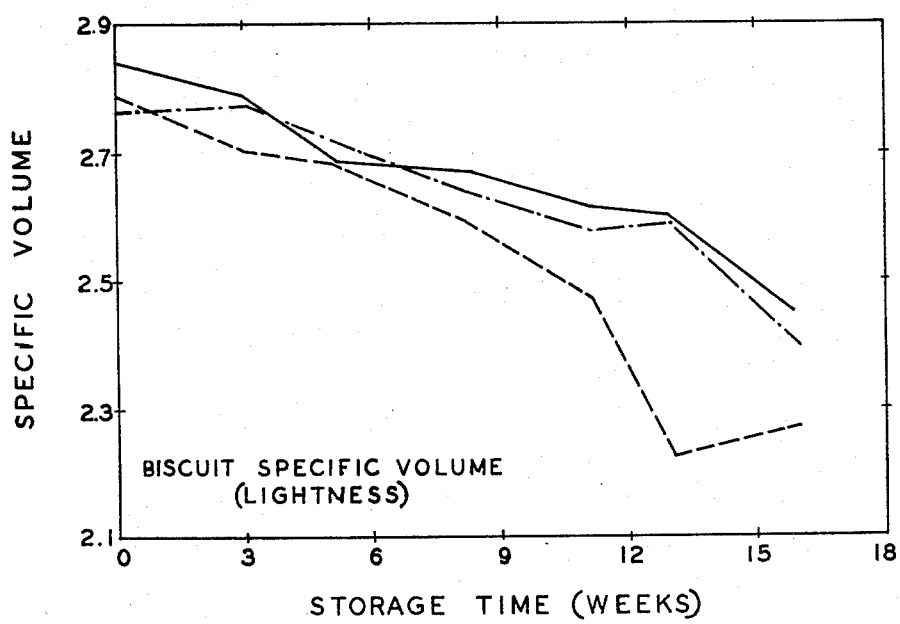
Figure 2:
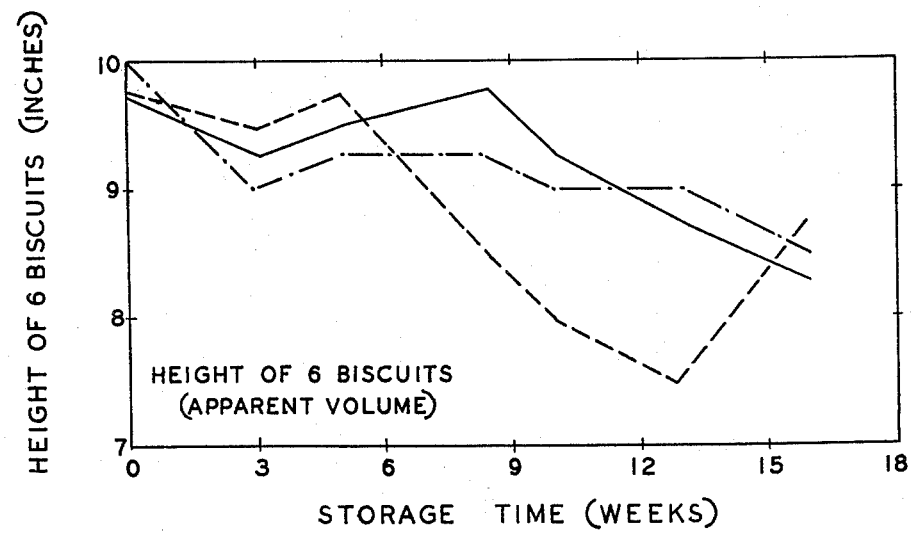

Nov. 5, 1963    J. W. TUCKER    3,109,738
SELF-RISING FLOUR COMPOSITIONS COMPRISING
MIXTURES OF SODIUM ALUMINUM PHOSPHATE
AND ANHYDROUS MONOCALCIUM PHOSPHATE
Filed March 5, 1963    2 Sheets-Sheet 1

FLOURS STORED AT HOUSTON, TEXAS
MID-APRIL THROUGH MID-AUGUST, 1960

—·— SAP
——— MCP
——— 80% SAP 20% MCP

INVENTOR
JAMES W. TUCKER

BY *Louis F. Kling, Jr.* AGENT

Nov. 5, 1963  J. W. TUCKER  3,109,738
SELF-RISING FLOUR COMPOSITIONS COMPRISING
MIXTURES OF SODIUM ALUMINUM PHOSPHATE
AND ANHYDROUS MONOCALCIUM PHOSPHATE
Filed March 5, 1963  2 Sheets-Sheet 2

—··— SAP
——— MCP
——— 80% SAP 20% MCP

INVENTOR
JAMES W. TUCKER

BY *Louis F. Kline Jr.* AGENT

United States Patent Office 3,109,738
Patented Nov. 5, 1963

3,109,738
SELF-RISING FLOUR COMPOSITIONS COMPRISING MIXTURES OF SODIUM ALUMINUM PHOSPHATE AND ANHYDROUS MONOCALCIUM PHOSPHATE
James W. Tucker, Park Forest, Ill., assignor to Stauffer Chemical Company, New York, N.Y., a corporation of Delaware
Filed Mar. 5, 1963, Ser. No. 263,682
7 Claims. (Cl. 99—94)

The present invention is directed to improved self-rising flour compositions having high stability when subjected to adverse conditions of storage, acid-reacting mixtures for use therein, and the leavened biscuits produced when baking a dough prepared from said compositions.

Self-rising flour (or SRF) is defined in the Federal Register of May 2, 1961, Title 21, Part 15, section 15.50(a), Definition and Standards of Identity, as follows:

"Self-rising flour, self-rising white flour, self-rising wheat flour, is an intimate mixture of flour, sodium bicarbonate, and one or more of the acid-reacting substances monocalcium phosphate, sodium acid pyrophosphate, and sodium aluminum phosphate. It is seasoned with salt. When it is tested by the method prescribed in paragraph (c) of this section not less than 0.5 percent of carbon dioxide is evolved. The acid-reacting substance is added in sufficient quantity to neutralize the sodium bicarbonate. The combined weight of such acid-reacting substance and sodium bicarbonate is not more than 4.5 parts to each 100 parts of flour used."

The term "self-rising flour" used herein is intended to describe compositions within the definition set forth above.

Self-rising flour was first introduced for household use in 1910. At that time, local flour mills blended the ingredients for distribution and consumption in the neighboring area. The leavening acid used in the early compositions, a hydrated monocalcium phosphate, was sufficiently stable for the prevalent local use but produced poor bench action with a loss of leavening gas during dough preparation. To meet this problem in 1939 a delayed-action leavening acid, anhydrous monocalcium phosphate was introduced. This acid set a new standard of excellence and has been largely responsible for the rapid growth of self-rising flour to its present importance in the baking art.

Today, however, changed marketing conditions in which self-rising flour is often blended by large manufacturers and shipped, stored, and/or used at remote locations under somewhat adverse atmospheric conditions, have produced new problems. No longer is this cereal-derived product delivered quickly to the consumer: most often thirty to sixty days or more elapse before the flour appears on the grocery shelf. Considerable degradation of the flour may result from these prolonged storage periods, especially under hot and/or humid atmospheric conditions, e.g., those found in some southernmost States of the United States or the more northerly States during the summer season.

Surface moisture in the flour constituent is the major cause of instability of self-rising flour. Milled flours presently used commercially in SRF formulations usually have 13.5% to 14.25% total moisture content, of which about 2% is surface or available moisture with the remainder bound moisture. Although the flour may be carefully dried to remove substatnially all of the surface moisture, this practice is normally undesirable for SRF because of the time and expense involved. Long periods of storage of a self-rising flour containing significant amounts of surface moisture, even under fairly mild atmospheric conditions, will produce considerable reversion of the anhydrous monocalcium phosphate to the hydrated form, e.g., the type previously improved upon. In hot, humid climates hydrolytic degradation is more rapid and will effect stability even in dried flour. To meet this situation, the formulator of self-rising flour now needs leavening acid components, the loci of degradation, which are more stable to adverse storage conditions. Other prepared mixes, e.g., dry cake mixes, are especially packaged and contain dry flours to prevent degradation of the leavening components.

I have now discovered that self-rising flour formulations comprising, as the acid-reacting component, a mixture of sodium aluminum phosphate and anhydrous monocalcium phosphate, have excellent baking characteristics and a high degree of storage stability. Rather than exhibit qualities intermediate between the two known leavening agents, the mixtures thereof somehow co-act to furnish the best qualities of both. As will be illustrated hereinafter, self-rising flours containing the novel mixtures will initially yield, on baking, very light and desirable biscuits, such as those obtainable heretofore with flours containing only anhydrous monocalcium phosphate as the leavening agent. On the other hand, unlike flours containing anhydrous monocalcium phosphate, those containing the mixed leavening agents have a high degree of storage stability, in some instances approaching that obtainable with sodium aluminum phosphate as the sole leavening agent. Apparently, then, the association of the two leavening acids result in a synergistic effect which produces an excellent baking response, and one which is not quickly diminished thereafter by adverse conditions of storage.

The sodium aluminum phosphate (SAP) which may be used in the compositions of the invention is a complex, acidic soluble compound which may be represented generally by the formula: $M_xAl_yH_z(PO_4)_{7-10} \cdot 0-8H_2O$ where M is an alkali metal selected from the group consisting of sodium, potassium, and mixtures thereof, and $x$, $y$, and $z$ are numbers of from 1 to 5, 2 to 4, and 11 to 17, respectively, with the sum of $x+3y+z$ numerically equal to the sum of the valences of the phosphate ($PO_4^\equiv$) radicals, i. e., between 21 and 30. Also, M will comprise at least one gram atom of sodium. Non-hygroscopic potassium modified forms of sodium aluminum phosphate, where M in the above formula is both sodium and potassium, are disclosed in copending Blanch application, U.S. Serial No. 148,332, filed October 30, 1961. The compounds may be in either a crystalline or amorphous form. The safety of baked products containing sodium aluminum phosphate is well-established, and sodium salts, aluminum salts, and salts of phosphoric acid are recognized constituents of foods leavened by baking creams, baking powders, and the like. Sodium aluminum phosphate has been included among the substances generally recognized as safe for food use, under buffers and neutralizing agents, Federal Register, Regulations, Title 21, Chapter 1, Sub-Chapter B, Part 121, Sub-part B, 121.101.

One particularly preferred form found suitable for use in the present invention is the crystalline compound of the formula $NaAl_3H_{14}(PO_4)_8 \cdot 4H_2O$, disclosed in U.S. Patent 2,550,490, and its stabilized form disclosed in the aforesaid Blanch application. Of the various modifications, this compound (herein referred to as "SAP, tetrahydrade") furnishes the most desirable combination of stability and baking response.

Nevertheless, the other acidic SAP modifications may be used since they are excellent baking acids and demonstrate a relatively high degree of stability when used in the compositions of the invention. In this regard the compounds of the formulas $Na_4Al_2H_{14}(PO_4)_8 \cdot H_2O$ (disclosed in copending Vanstrom application, Serial No. 172,852, filed February 13, 1962):

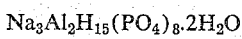
$$Na_3Al_2H_{15}(PO_4)_8 \cdot 2H_2O$$

(disclosed in copending Vanstrom application, Serial No. 173,054, filed February 13, 1962); and

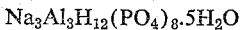
$$Na_3Al_3H_{12}(PO_4)_8 \cdot 5H_2O$$

(disclosed in copending Vanstrom application, Serial No. 172,865, filed February 13, 1962) have been found suitable for inclusion in the novel compositions. Further, the dehydrated forms of SAP, e.g.

$$NaAl_3H_{14}(PO_4)_8 \cdot 0\text{-}1H_2O$$

(disclosed in U.S. Patent 2,958,750; the amorphous compounds of the general formula $NaAl_3H_{11}(PO_4)_7 \cdot 5\text{-}8H_2O$ (U.S. Patent 2,995,421) and other species of sodium aluminum acid orthophosphates have utility at least to some degree, when used as acid-reacting components of the novel compositions, and therefore, as used herein, the term "sodium aluminum phosphate" or simply "SAP" is intended to include all of the various crystalline or amorphous acidic modifications of the above compounds.

The monocalcium phosphate (MCP) suitable for the present invention is the anhydrous from represented by the general formula $Ca(H_2PO_4)_2$. Because the final step in the preparation of this compound comprises heating to produce a coated product, it is sometimes referred to as heat-treated or coated monocalcium phosphate, anhydrous. It is a white, granular, free-flowing powder available in commercial quantities under various trade names. The individual particles of heat-treated monocalcium phosphate, anhydrous have a thin, continuous coating of a relatively insoluble phosphate which delays solution when contacting aqueous liquids. Products of this type are described more fully in U.S. Patents 2,160,700 and 2,160,232. When used herein, the term monocalcium phosphate or simply MCP is intended to refer to this anhydrous coated form.

An inflexible formulation cannot be stated for self-rising flour as each manufacturer may vary the ratio of acidic to basic reacting ingredients to accommodate for variations in flour type, flour grade, and trade demands within the area served, as well as varying the total leavening ingredients depending upon the time and conditions of storage expected prior to sale to the consumer. However, the total quantity of leavening salts, i.e., both soda and leavening acids, will not exceed 4.5 parts by weight for each 100 parts by weight flour.

The quantity of acid which may be used should be at least sufficient to theoretically completely neutralize 90% of the bicarbonate of soda constituent. A slight excess of acid up to about 50% greater than theory, or said another way, about 50% greater than that which will theoretically neutralize all of the soda present, may be used. In determining how much acid is needed, the neutralizing strength (NS) of the acid must be taken into consideration. Neutralizing strength is measured as the parts by weight of bicarbonate of soda which will be neutralized by exactly 100 parts by weight of the acid reacting substance. Anhydrous heat-treated monocalcium phosphate has a theoretical NS value of 83.5, that is, for every 83.5 grams of soda, 100 grams of monocalcium phosphate are necessary to achieve complete neutralization. Sodium aluminum phosphate and its stabilized forms, on the other hand, vary in theoretical NS value between about 96 and 115 depending upon the particular modification used. The empirical equation for each modification and the number of acidic hydrogen atoms contained therein may be used to estimated the NS value. Where mentioned herein, the proportions of SAP and monocalcium phosphate used are based on weight percentages. Nevertheless, it is also necessary to know the individual NS values in order to calculate the total acidity of the acid-reacting mixture. For instance, if it is decided to exactly neutralize 1.5 parts by weight soda with an 80% SAP, tetrahydrate-20% MCP mixture, the theoretical quantity of acid required will equal about 1.24 parts SAP and 0.31 part MCP. It is well to note, however, that in actual practice commercial grades of SAP and MCP will often have slightly lower NS values than predicted by theory, in most cases from about one to five units lower than theory.

By the present invention, satisfactory stability and baking response are obtained with formulations containing from about 1.0 to 1.9 parts by weight of bicarbonate of soda. All parts mentioned herein are by weight and are based on 100 parts by weight flour, e.g., a self-rising flour said to contain 2.0 parts bicarbonate of soda will comprise 2.0 parts by weight bicarbonate of soda for each 100 parts by weight of flour. The most desirable soda concentration, and that used most often in present day commercial self-rising flours, is within the range of from 1.25 to 1.6 parts by weight of soda. A self-rising flour containing about 1.375 parts soda; 1.2 parts SAP, tetrahydrate; and 0.3 parts MCP (an 80%–20% mixture) has been found preferable by virtue of its combined excellence of stability and baking response.

It has been found that the highest degree of storage stability is obtained with SAP-MCP mixtures in which the sodium aluminum phosphate predominates. The optimum stability is usually found with a mixture consisting of about 80% SAP and 20% MCP by weight. Nevertheless, at all proportions of the two acids the stabilities found are an improvement over the MCP leavening acid used heretofore.

The following table shows the effects of accelerated storage upon self-rising flours containing MCP or SAP (tetrahydrate), or mixtures of the two. The self-rising flour ingredients were blended in commercial equipment and under accepted commercial procedure. Each sample was placed in a five pound paper sack similar to those used in commercial practice, which was transferred to a storage cabinet in which the humidity and temperature were controlled at 75% and 92° F., respectively. At predetermined intervals one bag of each of the various samples was removed from the cabinet, made into a biscuit dough, and baked in the usual manner for biscuits, as described in Cereal Laboratory Methods, 6th Ed., 1957, paragraph 11.5 Baking Quality of Biscuit Flour, Self-Rising. Biscuit specific volume reported is an index of lightness of a baked product, being considered in the art as an important judgment of the effects of storage conditions upon baking response.

TABLE I

*Accelerated Storage of SRF at 92° F. and 75% R.H.*

| Storage time, days | 100% MCP, spec. vol. | 60% SAP, 40% MCP, spec. vol. | 70% SAP, 30% MCP, spec. vol. | 80% SAP, 20% MCP, spec. vol. | 100% SAP, spec. vol. |
|---|---|---|---|---|---|
| 0 | 2.76 | 2.76 | 2.74 | 2.70 | 2.58 |
| 2 | 2.56 | 2.62 | 2.63 | 2.66 | 2.57 |
| 4 | 2.51 | 2.58 | 2.61 | 2.63 | 2.58 |
| 6 | 2.47 | 2.55 | 2.59 | 2.64 | 2.54 |
| 8 | 2.44 | 2.53 | 2.59 | 2.64 | 2.56 |

Each sample subjected to the accelerated storage of Table I contained 1.37 parts soda. The quantity of acid used was based on neutralizing strengths of 98.2 for SAP and 78.5 for MCP. As a result of using these values, the self-rising flour composition contained a slight excess of acid-reactant substances.

From Table I it may be observed that the self-rising flour containing MCP leavening acid was severely degraded by storage. It is interesting to note, however, that none of the biscuits had a specific volume below 2.4, the usual value obtained in early self-rising flours containing monocalcium phosphate, monohydrate. Biscuits having specific volumes at or below about 2.4 are generally characterized by a heavy, coarse grain and firm texture, while those above this value are acceptable. A value in the vicinity of 2.7 for specific volume indicates a many celled, thin-walled grain and a soft texture or about optimum commercial desirability. Although present in equivalent acidic strength as the SAP-MCP mixtures, it may be seen from Table I that flour containing only SAP baking acid at the 1.37 soda level used for this test, produces biscuits with lower specific volumes than flours containing the leavening acid mixtures of the invention. Biscuits produced from self-rising flours containing only SAP as a leavening ingredient have also been found to have poor symmetry and dense grain with a prohibitively large amount of side wall splitting. For these reasons, inter alia, SAP has not been considered heretofore as a satisfactory leavening agent for self-rising flours.

Accelerated storage as hereafter described (75% R.H. and 92° F.) for ten days is estimated to be equivalent to normal storage in Florida for about eight weeks under the most severe conditions encountered there.

EXAMPLE 1

Using substantially the same techniques and apparatus currently employed by commercial blenders of SRF, three batches of flour were prepared, each containing 1.37 parts soda and 2.25 parts sodium chloride. One batch contained SAP as the exclusive leavening acid, another had only MCP, and the remaining batch contained a mixture comprising 20% MCP and 80% SAP, tetrahydrate. The following table shows the compositions of the three SRF batches.

TABLE II

|  | 100% SAP, parts by weight | 80% SAP, 20% MCP, parts by weight | 100% MCP, parts by weight |
|---|---|---|---|
| Soft wheat flour | 100.00 | 100.00 | 100.00 |
| Bicarbonate of soda | 1.37 | 1.37 | 1.37 |
| SAP | 1.45 | 1.20 |  |
| MCP |  | 0.30 | 1.75 |
| Salt | 2.25 | 2.25 | 2.25 |

All of the blends of Table II were prepared from a common lot of soft wheat flour. After being packaged in standard five pound paper sacks, a number of samples of each formulation were shipped for storage to Houston, Texas; Victor, Florida; and Nashville, Tennessee. At these storage points the sacks of self-rising flour were removed from shipping containers and stored under warehouse conditions, with protection against rodents and insects. At predetermined intervals, one sack of each self-rising flour was shipped from each station to Chicago Heights, Illinois, for baking tests.

To further check stability effects, samples identical to those of Table II were placed under accelerated storage conditions in a "Tenney cabinet." These samples and those received from the outlying stations were made into biscuit doughs which were baked at oven temperatures within the range of from 300° F. to 500° F. according to standard scientific baking practices, e.g., see Cereal Laboratory Methods, op. cit. Two criteria, biscuit specific volume and biscuit height (height of six biscuits, measured in inches), were employed in evaluating the results of the bake tests. Although many other judgments may be used to evaluate the baking response of self-rising flour, the two used herein reflect to a large degree the effect of adverse storage conditions and are well-known, reproducible measurements of the baking art. See for example, Phosphoric Acid, Phosphates and Phosphatic Fertilizers, W. H. Waggaman, Reinhold Corp., 2nd Edition, 1952, pp. 450–455.

The data given hereinafter were obtained on laboratory tested samples returned from Texas, Florida, and Tennessee at approximately three week intervals. Biscuits baked from the flours containing only SAP, tetrahydrate and the 80% SAP–20% MCP mixtures, were found to gradually decrease in specific volume (lightness), but not to an objectionable degree, with consecutive three week samples over a sixteen week period. At the end of the sixteen weeks, these samples showed specific volumes of about 2.4 or above. However, objectionable results (specific volumes below 2.4) were found after only about eleven weeks with biscuits baked from the flour containing MCP as the exclusive leavening acid. Self-rising flours referred to herein as "stable" are those which are capable of producing satisfactory biscuits according to both of the baking criteria mentioned, i.e., specific volumes greater than 2.4 and biscuit height greater than 7.0 inches, after storage in a hot, humid atmosphere. None of the flours produced objectionable biscuit heights (volume), even though the biscuits containing the MCP-leavened flour approached closely to the objectionable level of seven inches, over-all, after the flour was stored for about twelve to fifteen weeks.

More specific data regarding both the warehouse stored flours and those exposed to accelerated storage are given in FIGURES 1 through 4. FIGURE 1 shows the specific volume of biscuits prepared from the flour stored in Houston, Texas. Height of biscuits prepared from the Houston samples is reported in FIGURE 2. The Houston samples were stored from mid-April through mid-August, 1960, being tested at about three week intervals over a total period of sixteen weeks. From FIGURE 1 it may be seen that the 80% SAP–20% MCP flour gave better results (lighter biscuits) initially and continued to give superior biscuits throughout essentially all of the storage period. Although initially producing lower biscuit heights than the flours containing the single SAP and MCP acids, the samples containing 80% SAP–20% MCP may be seen in FIGURE 2 to yield better biscuit heights than either of the single acids during a major, and certainly the most critical, portion of the storage period (about one to three months of storage).

Figure 3:
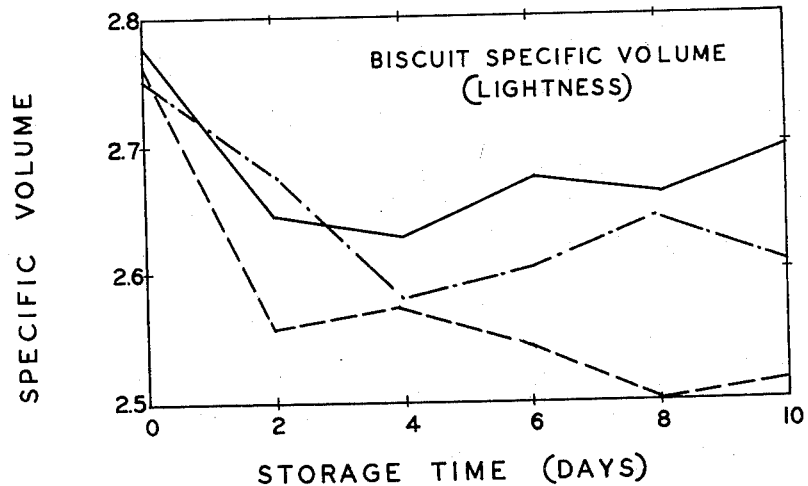
Figure 4:
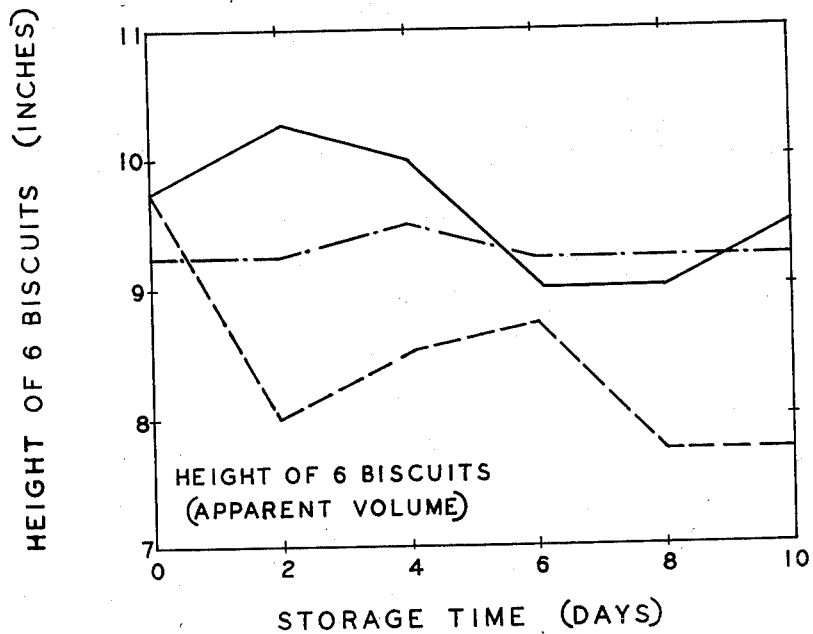

FIGURES 3 and 4 are plotted from the baking response data obtained on biscuits prepared with self-rising flours, compounded according to the formulations of Table II, which have been subjected to accelerated storage at 92° F. and 75% relative humidity. Samples of each formulation were tested every two days for biscuit specific volumes and heights. Data on the specific volume tests are presented in FIGURE 3, while the biscuit height data are presented in FIGURE 4. Comparing the curves of FIGURES 3 and 4 with FIGURES 1 and 2, it may be seen that generally the 80% SAP–20% MCP flours have about the same comparative resistance to degradation by accelerated storages as with normal storage. The flour samples stored in Victor, Florida, and Nashville, Tennessee, showed essentially the same baking response characteristics when tested as those stored in Houston, Texas.

EXAMPLE 2

Employing the procedure described in Example 1, a self-rising flour was prepared with the following composition:

| | Parts by weight |
|---|---|
| Soft wheat flour | 100 |
| Bicarbonate of soda | 1.375 |
| SAP, tetrahydrate [1] | 1.26 |
| MCP | 0.39 |
| Tricalcium phosphate | 0.1 |
| Salt | 2.25 |

[1] Containing 0.5% $K_2O$ by weight added during preparation.

While subjecting the above composition to accelerated storage at 90° F. and 75% relative humidity, test batches of biscuits were periodically prepared therefrom. The results of the biscuit bake tests are as follows.

| Storage time, days: | Specific volume of biscuits |
|---|---|
| 0 | 2.63 |
| 2 | 2.54 |
| 4 | 2.56 |
| 6 | 2.60 |
| 8 | 2.59 |

Other baking criteria and visual inspection indicated further the superiority of the mixed leavening acids. For example, SAP alone or in combination with MCP gave much better baking results, as compared to MCP alone, where the doughs were held for one, four, and twenty-four hours at refrigerator temperatures (40° F.) before baking. Both specific volume and height were measured in these tests. The flours containing mixed acids were found, under normal baking conditions, to result in biscuits with less side wall splitting than the prior art flours. Crumb color was essentially the same with all stored samples. Superiority of the mixtures was evident with biscuits prepared with either water or milk as the dough-forming liquid. The rate of reaction (between the acid and soda) in the 80% SAP–20% MCP flours was found to remain substantially unchanged while flours containing only MCP were found to almost double in rate after ten days of accelerated storage. Rate change is due to hydration of the relatively insoluble coating about the MCP particles.

EXAMPLE 3

A compound of the formula $$Na_3Al_2H_{15}(PO_4)_8 \cdot 2H_2O$$

was made up into a standard self-rising flour formula and baked off by standard procedures. The proportion of acid-reacting component used was based upon an assumed neutralizing value of 100. Biscuits baked in this manner and containing the above compound were found to have essentially the same specific volumes and available acidity as those baked from formulations containing the tetrahydrate form of SAP. Further, an acid-reacting mixture comprising a major amount of sodium aluminum phosphate of the formula $Na_3Al_2H_{15}(PO_4)_8 \cdot 2H_2O$ and a minor amount of anhydrous monocalcium phosphate was found to be extremely stable to adverse storage conditions when stored as such or as a component in a self-rising flour composition.

In addition to flour and leavening acids, bicarbonate of soda and salt (sodium chloride) will also be contained in the self-rising flour formulations of the invention. The foregoing are necessary or principal ingredients and will be invariably included in some proportion in my self-rising flour compositions. Other possible constituents may be termed ameliorating agents, and these usually serve to either prevent moisture absorption by the somewhat hygroscopic SAP acid-reacting ingredients or enrich the flour by increasing its calcium content. The ameliorating agents will be present, if at all, in very minor amounts, normally less than 1% of the weight of the flour constituent. Those which produce a stabilizing effect are generally added to sodium aluminum phosphate, including the tetrahydrate modification, during or immediately after manufacture and before any subsequent blending with other ingredients. In this manner, the free-flowing quality of the acid is retained until it is later used by the consumer or blended into a self-rising flour formulation. Some of the compounds used for acid-stabilization are tricalcium phosphate, calcium carbonate, urea, monoammonium phosphate, sodium silicate, cornstarch, various water- or alcohol-soluble potassium salts, and mixtures thereof. The calcium compounds, especially calcium carbonate and tricalcium phosphate, are highly preferable since they serve the dual purpose of stabilizing the acid and enriching the self-rising flour compositions. Various other edible calcium compounds, mainly the phosphates of calcium, may be used for the purpose of enriching the formulations and these may be added during blending of the flour ingredients. For a comprehensive survey of flour enrichment and the standards pertaining thereto adopted by the Food and Drug Administration, see Phosphoric Acid, Phosphates and Phosphatic Fertilizers, op. cit., p. 459 et seq. Because of the relatively small quantities of the ameliorating agents and their high compatibilities with my self-rising flour compositions, they affect flavor, baking response, leavening action and other qualities of the compositions to a negligible, almost imperceptible, degree.

This application is a continuation-in-part of my prior copending application, Serial No. 226,764, filed September 7, 1962, which, in turn, was a continuation-in-part of my application Serial No. 107,096, filed May 2, 1961 both abandoned.

The foregoing description is given for clearness of understanding only, and no unnecessary limitations should be understood therefrom as modifications will be obvious to those skilled in the art.

I claim:

1. A stable self-rising flour composition which comprises an intimate mixture of flour, salt, bicarbonate of soda and a leavening proportion of an acid-reacting substance comprising mixtures of sodium aluminum phosphate and anhydrous monocalcium phosphate.

2. A stable self-rising flour composition which comprises an intimate mixture of flour, salt, bicarbonate of soda and a leavening proportion of an acid-reacting mixture comprising a major amount of sodium aluminum phosphate and a minor amount of anhydrous monocalcium phosphate.

3. The stable self-rising flour composition described in claim 2 in which the acid-reacting mixture contains a weight ratio of sodium aluminum phosphate to anhydrous monocalcium phosphate of about 4:1.

4. A stable self-rising flour composition which comprises an intimate mixture of 100 parts flour, from 1.5 to 2.5 parts salt, from 1.0 to 1.9 parts bicarbonate of soda, and an acid-reacting mixture comprising sodium aluminum phosphate, tetrahydrate and anhydrous monocalcium phosphate in sufficient quantity to theoretically neutralize 90% to 150% of the bicarbonate of soda.

5. A stable self-rising flour composition comprising an intimate mixture having the following ingredients in approximately the indicated proportions:

| | Parts |
|---|---|
| Flour | 100 |
| Salt | 1.50–2.50 |
| Bicarbonate of soda | 1.37 |
| Sodium aluminum phosphate, tetrahydrate | 1.20 |
| Anhydrous monocalcium phosphate | 0.30 |
| Ameliorating agents | 0.00–1.00 |

6. A stable self-rising flour composition comprising an intimate mixture having the following ingredients in approximately the indicated proportions:

| | Parts |
|---|---|
| Flour | 100 |
| Salt | 2.25 |
| Bicarbonate of soda | 1.37 |
| Sodium aluminum phosphate, tetrahydrate | 1.20 |
| Anhydrous monocalcium phosphate | 0.30 |
| Calcium carbonate | 0.25 |

7. A stable self-rising flour composition comprising an intimate mixture having the following ingredients in approximately the indicated proportions:

| | Parts |
|---|---|
| Flour | 100 |
| Salt | 2.25 |
| Bicarbonate of soda | 1.375 |
| Sodium aluminum phosphate, tetrahydrate | 1.26 |
| Anhydrous monocalcium phosphate | 0.39 |
| Tricalcium phosphate | 0.1 |

References Cited in the file of this patent

UNITED STATES PATENTS

| 2,550,490 | McDonald | Apr. 24, 1951 |
| 2,550,491 | McDonald | Apr. 24, 1951 |
| 2,995,421 | Dyer | Aug. 8, 1961 |
| 3,041,177 | Lauck et al. | June 26, 1962 |

OTHER REFERENCES

"Cereal Science Today," April 1959, pages 91, 92 TP 1C 317.